(12) United States Patent
Kehrle et al.

(10) Patent No.: US 7,466,313 B2
(45) Date of Patent: Dec. 16, 2008

(54) METHOD FOR INTERACTIVE CONSTRUCTION OF VIRTUAL 3D MODELS

(75) Inventors: Klaus Kehrle, Bondorf (DE); Andre Stork, Darmstadt (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1510 days.

(21) Appl. No.: 09/747,678

(22) Filed: Dec. 22, 2000

(65) Prior Publication Data

US 2001/0007095 A1    Jul. 5, 2001

(51) Int. Cl.
*G06T 15/00* (2006.01)
*G09G 5/00* (2006.01)

(52) U.S. Cl. .................. 345/419; 345/652; 345/630

(58) Field of Classification Search ................ 345/649, 345/650, 652, 672, 676, 678, 473, 474, 419, 345/964, 655; 703/1, 6
See application file for complete search history.

(56) References Cited

U.S. PATENT DOCUMENTS

| | | | | |
|---|---|---|---|---|
| 4,918,627 A | * | 4/1990 | Garcia et al. | 702/82 |
| 5,153,721 A | * | 10/1992 | Eino et al. | 382/152 |
| 5,253,189 A | * | 10/1993 | Kramer | 703/7 |
| 5,410,496 A | * | 4/1995 | Bolon et al. | 703/7 |
| 5,452,238 A | * | 9/1995 | Kramer et al. | 703/1 |
| 5,463,722 A | * | 10/1995 | Venolia | 345/662 |
| 5,572,639 A | * | 11/1996 | Gantt | 345/651 |
| 5,588,097 A | * | 12/1996 | Ono et al. | 345/653 |
| 5,594,850 A | * | 1/1997 | Noyama et al. | 345/632 |
| 5,673,421 A | * | 9/1997 | Shirakawa | 345/501 |
| 5,682,468 A | * | 10/1997 | Fortenbery et al. | 345/419 |
| 5,799,320 A | * | 8/1998 | Klug | 707/201 |
| 5,803,461 A | * | 9/1998 | Pavlovic | D21/373 |
| 5,821,941 A | * | 10/1998 | Millstein | 345/420 |
| 5,831,875 A | * | 11/1998 | Hirata et al. | 703/7 |
| 5,835,693 A | * | 11/1998 | Lynch et al. | 345/473 |
| 5,859,786 A | * | 1/1999 | Klein | 703/2 |
| 5,889,528 A | * | 3/1999 | Zhao | 345/648 |
| 5,905,501 A | * | 5/1999 | Kato | 345/420 |
| 5,940,082 A | | 8/1999 | Brinegar et al. | |
| 6,014,127 A | * | 1/2000 | Blomqvist | 345/856 |
| 6,104,403 A | * | 8/2000 | Mukouchi et al. | 345/419 |
| 6,167,490 A | * | 12/2000 | Levy et al. | 711/148 |
| 6,229,552 B1 | * | 5/2001 | Koga et al. | 345/474 |

(Continued)

FOREIGN PATENT DOCUMENTS

DE    19838701 A1    6/1999

OTHER PUBLICATIONS

Jung, B., et al. "Knowledge-Based Assembly Simulation for Virtual Prototype Modeling" in IECON'98—Proceedings of the 24th Annual Conference of the IEEE Industrial Electronics Society, S. 2152-2157. [http://citeseer.nj.nec.com/79924.html].

(Continued)

*Primary Examiner*—Ryan R Yang

(57) ABSTRACT

The present invention provides a processing system for enabling modifications to be made to a virtual design in a CAD system, in particular a collaborative CAD system with a number of spatially distributed users. An indication is constantly provided as to the degrees of freedom of the components involved in any modification and the effects on the degrees of freedom of any changes to be made.

15 Claims, 7 Drawing Sheets

U.S. PATENT DOCUMENTS

| | | | |
|---|---|---|---|
| 6,323,859 B1 * | 11/2001 | Gantt | 345/419 |
| 6,341,291 B1 * | 1/2002 | Bentley et al. | 707/203 |
| 6,366,293 B1 * | 4/2002 | Hamilton et al. | 345/649 |
| 6,369,829 B1 * | 4/2002 | Bou et al. | 345/619 |
| 6,388,670 B2 * | 5/2002 | Naka et al. | 345/474 |
| 6,629,065 B1 * | 9/2003 | Gadh et al. | 703/1 |
| 6,646,641 B1 * | 11/2003 | White et al. | 345/428 |

OTHER PUBLICATIONS

German Office Action dated Sep. 3, 2002 for German Patent Application No. 100 65 820.2-53 (and English translation).

* cited by examiner 1. starting point

2. Introducing Edge-Edge association 3. test whether EE possible

4. Determine transformation matrix

5. Apply transformation

6. Reduce degree of freedom

METHOD FOR INTERACTIVE CONSTRUCTION OF VIRTUAL 3D MODELS

FIELD OF THE INVENTION

The present invention relates to a system for computer-aided design (CAD) and particularly for use in a multi-user, real-time collaborative CAD design process.

BACKGROUND

The present invention is for use in computer-aided construction or computer-aided design (CAD) and, particularly, mechanical CAD (MCAD). The method is used in simulating assembling and construction of models in virtual environments, whereby designers can try out and visualise different arrangements and interconnections, positioning, etc. and the effects of changes in the positioning or orientation of one component on other components. This enables the designer to make changes during the design process, before a model is actually built.

It has recently become more important that various designers and other participants can work on and view a design simultaneously, during the design process. Most engineering design results from the joint efforts of a highly qualified team of engineers, designers, marketing specialists, etc. The people involved in any particular product design may belong to different companies and may be based in widely differing locations.

To simplify such 'collaborative' design, a number of systems have been developed allowing designers based in different locations to work together over a network in a 'Virtual Design Studio'.

STATE OF THE ART

There are essentially two commonly used types of systems for construction simulation, namely collision detection and assembly modelling.

The collision detection method starts with tessellated models to achieve real-time capability. The collision detection between one or more moved components and their surrounding serves to identify whether the component or component group can be built without collision.

A number of disadvantages are, however, associated with collision-based construction processes. In particular, the tessellation results in a loss of accuracy and a loss in relationship with topological entities.

Furthermore, collision detection can, as the name suggests, only detect when two parts collide, within a given approximation accuracy and cannot determine when two parts 'fit'.

In assembly modelling processes, at the beginning, and during the construction, 'assembly features' can be added. These assembly features are essentially 'sub' components described in terms of their geometry and also their nature or behaviour. For example, a 'blind hole' can be defined as an assembly feature which is defined in terms of its geometrical features (length and radius) and also contains information on the direction in which the 'blind hole' is 'open'. This latter information is often represented by coordinate systems or frames. Such schematic information can be retrieved later for construction. A system related to this process takes into account 'allowable motion'. This provides an efficient means of satisfying 3D constraints by applying a number of transformation operations to the geometric entity, without invalidating its previously satisfied constraints. The technique of allowable motion is also used for developing an intuitive graphical means of achieving the accurate 3D positioning of a solid model by automatically constraining its 3D manipulation.

However, using such a system, relationships between components and their topological entity cannot be correctly introduced by user interaction. Furthermore, there is no, or insufficient depiction or visualisation of the degree of freedom which the various components have. Furthermore, a relationship cannot act simultaneously on a group of components.

Anantha et al. ("Assembly modelling by geometric constraint satisfaction", Computer-Aided Design, Vol. 28, No. 9, 1996) describe a way of combining assemblies on the basis of an assembly feature based model. This document teaches the use of analysis of degree of freedom of movement. However, it does not address intuitive interaction and real-time visualisation of the degree of freedom of components by several distributed engineers in a collaborative session.

Various commercial CAD systems are now available for positioning components and constructing circuits or computer models.

Some known systems, e. g. CATIA, IDEAS and Pro/E are constraint based systems.

In constraint based systems, the positioning of the components is defined by constraints or edge conditions defined by the user. Such constraints can be, for example, coincidence, parallelity, etc. The user first defines all of the required constraints and then an algorithm determines whether the various components can be positioned and/or reorientated to satisfy the edge conditions. If not, a message is displayed to the user and the user can then try to re-design to remove any obstructions preventing these conditions being satisfied.

However, a problem with such constraint based systems is that the user must first introduce or define all the required constraints and, only then, does the system see if the components can be positioned in accordance with these constraints. Thus, while the user is actually defining the constraints, he cannot be sure whether these are actually capable of being fulfilled. Such systems do not allow any intermediate checking as to whether the edge conditions can be fulfilled.

Other design systems currently available use the non-constraint based technique such as used in CoCreate's SolidDesigner product and IronCAD. SolidDesigner allows components to be positioned or orientated relative to each other by translation and rotation. During the design process, a positioning step can be carried out on a component, but this step in itself does not permanently constrain the position of the component and does not effect its degree of freedom. Thus, with each further transformation, the existing positioning can be changed.

IronCAD goes one step further and offers predefined position characteristics, e. g. surface-on-surface. In the IronCAD system, the positioning step is, again, temporary and can be later undone.

Although many advances have been made in systems for simulating the construction of virtual 3D-CAD models, and the various systems currently in use are very highly developed, they are still not ideally suited for decentralised collaborative real-time construction. They either require generation of construction-relevant data in advance or require knowledge of the construction history, when a change to the design is being made. Alternatively, existing systems may have problems as regards accuracy and are unable to provide to the user the necessary visual information which is required for collaborative design.

The present invention aims to solve these problems by enabling, in the simplest way possible, the assembly or construction of virtual 3D-CAD models which can be simultaneously worked on by a number of participants located in different places.

The system of the present invention provides information to the users which enables them to visualise the possibilities as to positioning and orientation of components in the design.

According to the invention, there is provided a method of changing the relative position and/or orientation of two components of a virtual model displayed on a screen, the method comprising:

selecting the components whose relative position and/or orientation is to be changed;

defining the change to be made; and calculating and providing on the screen an indication of the remaining degrees of freedom of the components after the change has been made.

Preferred embodiments of the invention will now be described, by way of example only, with reference to the accompanying drawings.

The invention can preferably be used in the context of one of the existing 3D collaboration design systems such as the OneSpace system of CoCreate. All participants in the design process are connected in a network via a 'collaboration server'. The reference model, which is always the current model, is contained in the server and changes made by individual participants to the model are communicated to all of the other participants via the server. Thus, all users see the same model at any time and all changes are continuously conveyed to all users. However, the users are able to select any view of the current model.

To position a component relative to another, the user selects the appropriate topological entities using a mouse click, for example, and associates these with each other, e. g. edge of component A to edge of component B. One component acts as a reference element and the other is translated and/or rotated relative to this reference element if its degree of freedom permits, as discussed below. The role of moved component and reference component can, of course, be changed from operation to operation.

To overcome collisions with other users, when one user is carrying out an operation, the components involved in that operation are 'locked' by the collaboration server, for the duration of the interaction, for all other users.

The components involved in any particular operation are automatically locked, short time, via the collaboration server and indicated to the users by a 'lock feedback'.

After the operation has been completed, the locking on these components is removed and they are available to all participants.

Instead of moving one component at a time, a group of components can be selected and positioned, thus enabling partial assemblies to be moved and positioned.

Topological entities can be associated with each other in the following relationships:
  Vertex to vertex
  Edge to edge
  Axis to axis
  Edge to axis and vice versa
  Face to face.

Figure 1:
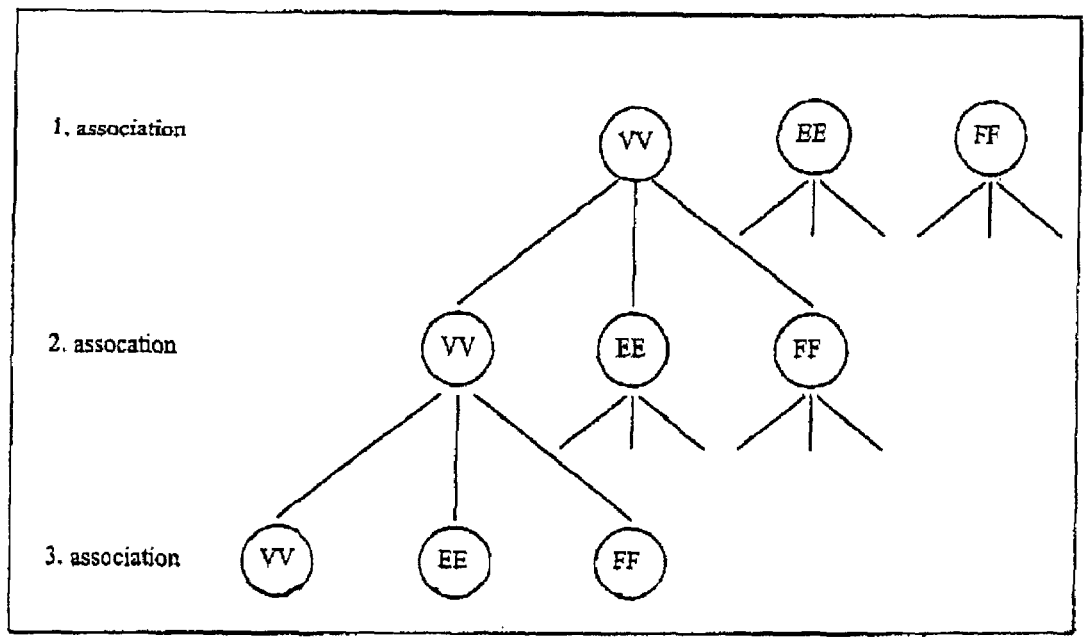
FIG. 1 shows possible geometric associations between components.

FIG. 1 shows some operation possibilities in the form of a tree diagram.

For each combination of degrees of freedom, a vertex, corner, edge or face relationship can be introduced which will reduce, in different ways, the degree of freedom, depending on the geometric constellation of the various associated elements. There are, therefore, 18 (or 21, if the combination 0, 0 is included) different possibilities for reducing the degree of freedom.

To start with, before being fixed in any position or orientation, the components all have six degrees of freedom—three degrees of rotational freedom and three degrees of translational freedom. After a positioning or orientation operation in relation to another component, the number of degrees of freedom may be reduced. Table 1 below shows combinations of degrees of freedom a component can have, after the above operations.

| ROTDOF | 3 | 3 | 1 | 1 | 1 | 0 | 0 |
|--------|---|---|---|---|---|---|---|
| TransDOF | 3 | 0 | 2 | 1 | 0 | 1 | 0 |

Figure 2:
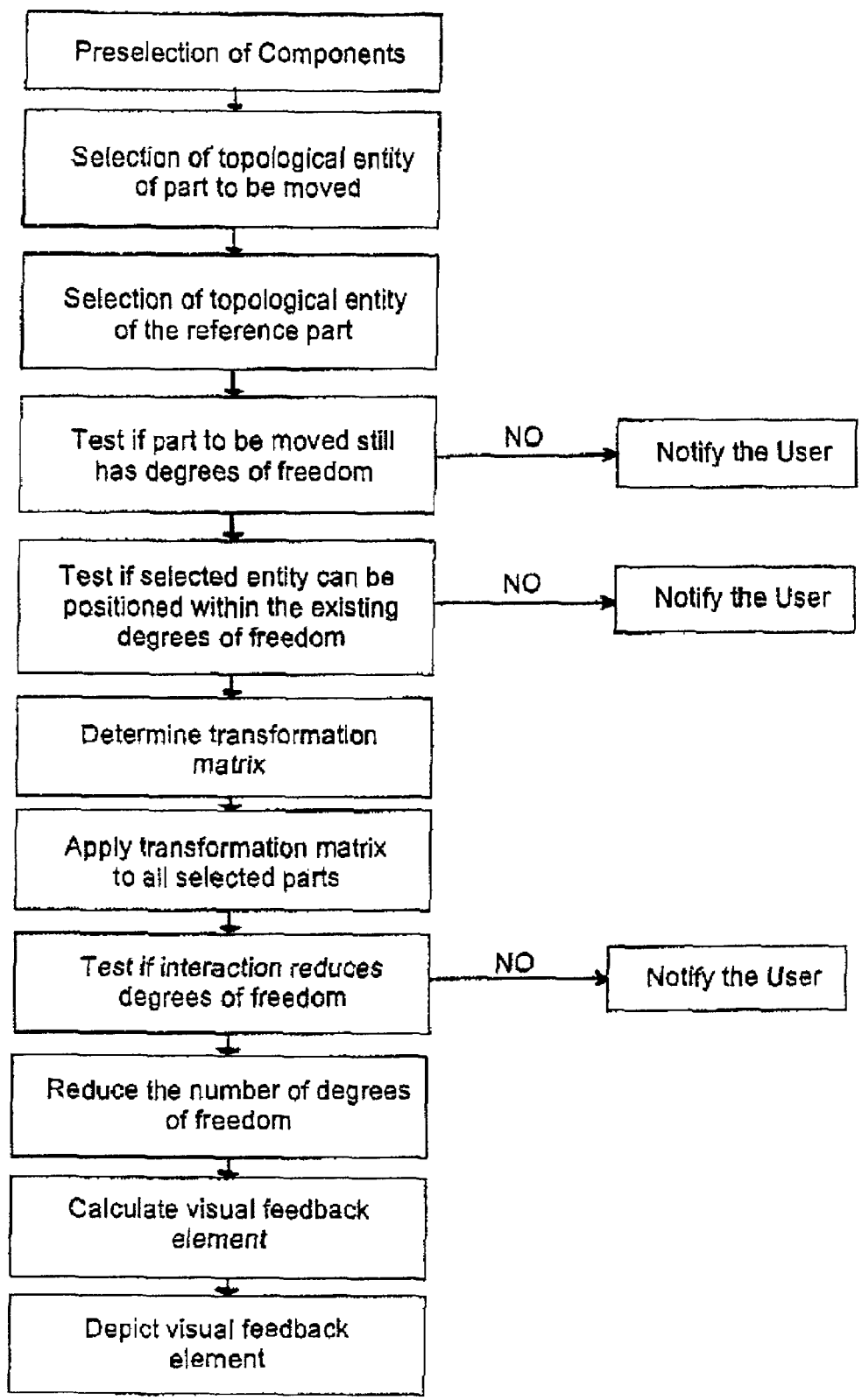
FIG. 2 is a flowchart showing the steps of a method in accordance with the invention.

FIG. 2 is a flowchart of the basic process steps when two components or elements are to be associated with each other. First, it is determined whether the desired operation can be fulfilled by transformation of the component within the existing limitations. If so, the component is accordingly transformed. This transformation may involve a reduction in the degrees of freedom. A visual feedback representing the remaining degrees of freedom is calculated, depicted and conveyed to all other users.

Should the users try to carry out operations which cannot be fulfilled within the existing degrees of freedom, they immediately receive a return message that the allocation cannot be permitted.

After making the desired transformation, the new positioning and remaining degrees of freedom are incrementally conveyed to all participants, via the collaboration server, i. e., to reduce the amount of data transmitted, only changes are transmitted.

The visual feedback elements, which show the remaining degrees of freedom after a positioning or orientation operation, serve as 3D operating elements (widgets) which can be clicked on to interactively move a component according to its degree of freedom. In order to obtain precise positioning, movements can be split into discrete steps. The user can determine the discrete steps by inputting values.

The method thus comprises five basic steps:

checking whether the particular component or group of components is currently available for positioning. If so, the component or group is locked, via the collaboration server, against use by other users during the operation.

The association between topological entities is introduced by the user, the appropriate transformation of the component or group of components is automatically calculated by the system.

To do this, first a check is carried out as to whether the current degree of freedom of that component enables it to be positioned or orientated at all. In a second step, the transformation matrix is calculated which leads to the component which is to be moved taking up the appropriate position and/or orientation.

A check is carried out as to whether this operation reduces the degree of freedom and, if so, the associated degree of freedom is reduced.

The remaining degree of freedom of the component(s) is calculated and visualised.

The locking on that component is then released and the new position and new degrees of freedom are transmitted to all users.

Figure 3:
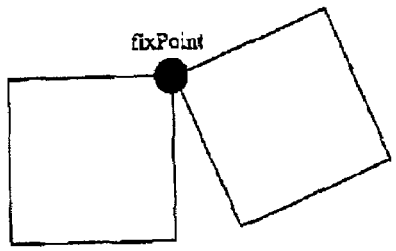
FIG. 3 shows an example of two objects being positioned in accordance with the invention.
Figure 3:
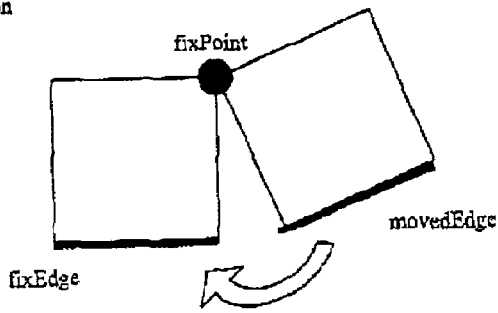
Figure 3:
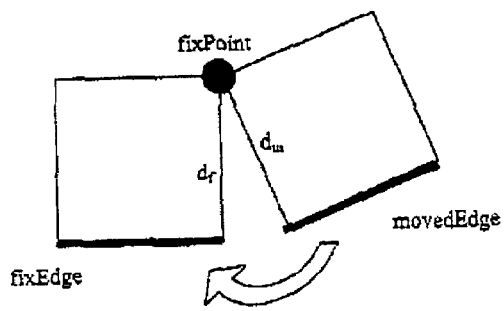
Figure 3:
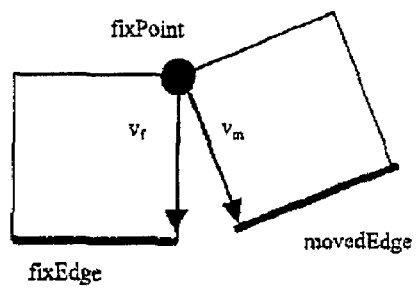
Figure 3:
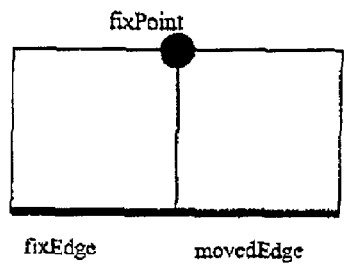
Figure 3:
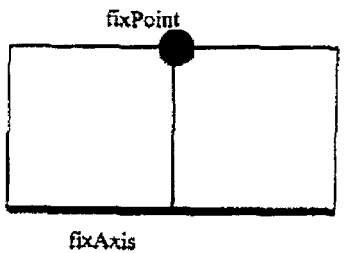
Figure 3:
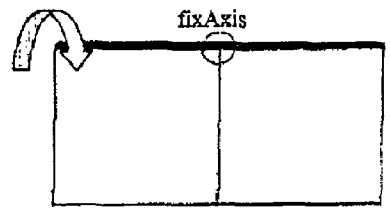

FIG. 3 shows a particular example of two objects being positioned and orientated relative to each other in accordance with the invention.

The two objects A and B have a corner-to-corner or vertex-to-vertex relationship. The designer then wishes to introduce an edge-to-edge relationship. Any other combinations can be carried out in a similar manner.

At the start, with the corner-to-corner relationship, the two objects still have three rotational degrees of freedom, but no translational degrees of freedom.

It is then determined whether or not an edge-to-edge positioning is possible for these two components. It is determined, in this case, that the edge-to-edge association can be precisely carried out by rotation (a translation is not permitted, due to the fact that the components have no translational degrees of freedom), if the distance between the fixed points, where the two corners are connected, and the edge of the reference component A is equal to the distance between the fixed point and the edge to be moved (of component B).

In this case, it is determined that the desired operation is possible and then the transformation matrix for carrying out this operation is determined. In this case, the transformation matrix (here a rotation matrix) is given by the following equation:

$$\text{rotAxis} = \text{crossProd}(v_m, v_f), \text{rotAngle} = \text{angle}(v_m, v_f)$$
$$\text{and fixPoint}$$

with $v_m$=movedEdge.nearestPoint(fixPoint)-fixPoint
$v_f$=fixEdge.nearestPoint(fixPoint)-fixPoint The transformation is then carried out. As this operation results in a reduction in the degrees of freedom of the components, this reduction is then also calculated. The combination of the fixed point and the edge-to-edge association leaves no further movement possibilities for these components, i. e. after the edge-to-edge association, the degree of rotational freedom is also reduced to zero. Thus, in this case, there is no need to calculate and depict a visual feedback showing the remaining degrees of freedom.

Should fixedPoint lie on the moved edge and on the fixed edge, then a fixed axis results which includes the fixed point and there then remains a rotational degree of freedom for the combined assembly which can be correspondingly visualised.

FIGS. 4 to 11 show various visual feedbacks, which show the user the remaining degrees of freedom.

Figure 4:
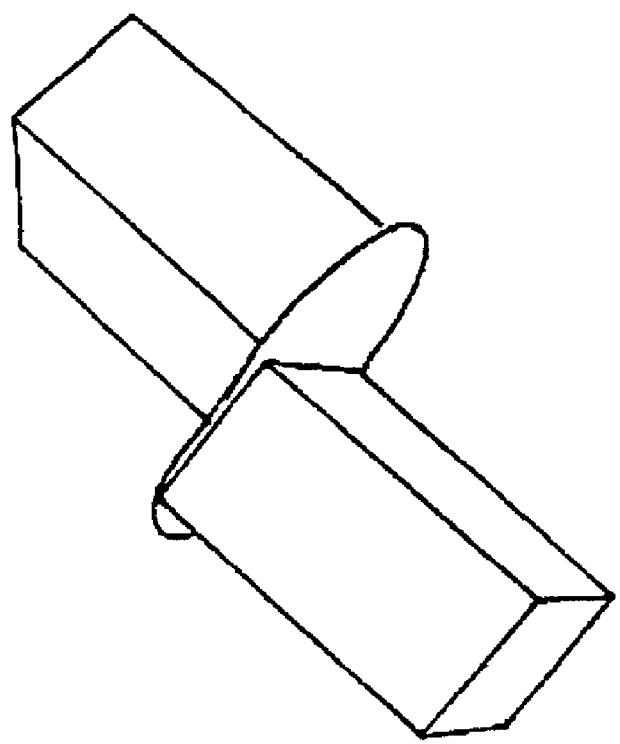
FIGS. 4 to 11 show different visual feedbacks.

FIG. 4 shows the situation after a surface-to-surface association, showing the visual feedback for two translational and one rotational degrees of freedom.

Figure 5:
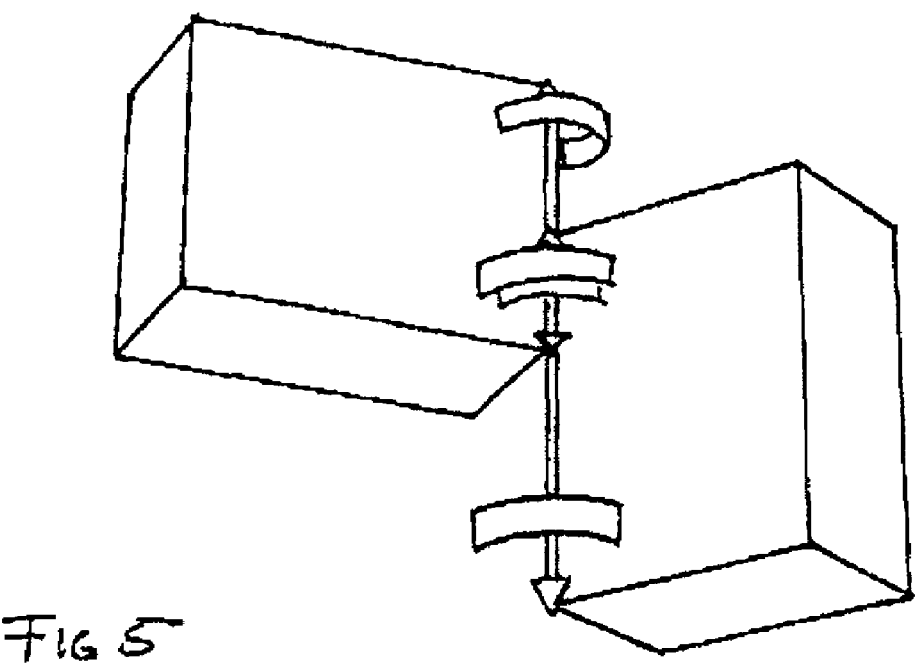

FIG. 5 shows the situation after an edge-to-edge association, for example, showing the visual feedback for one translational and one rotational degree of freedom.

Figure 6:
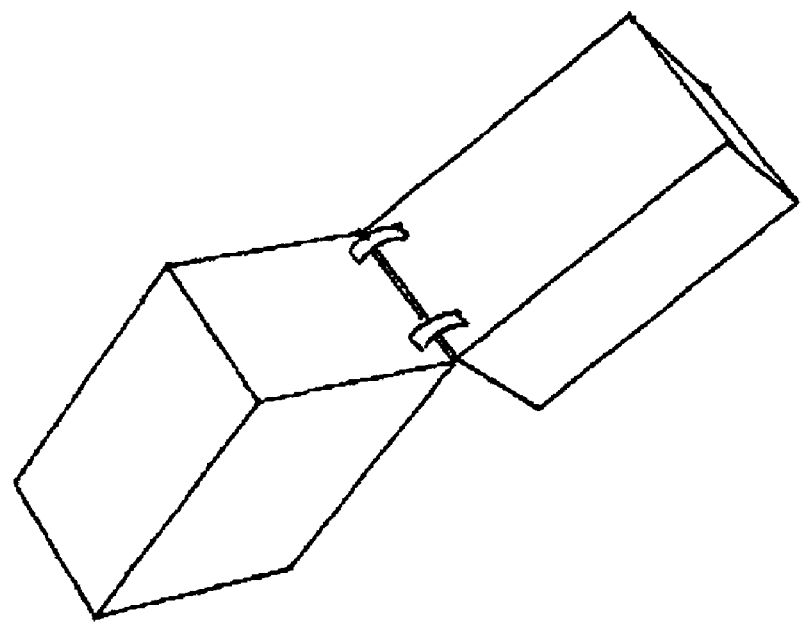

FIG. 6 shows the visual feedback for one rotational degree of freedom, e. g. after a corner-to-edge association.

Figure 7:
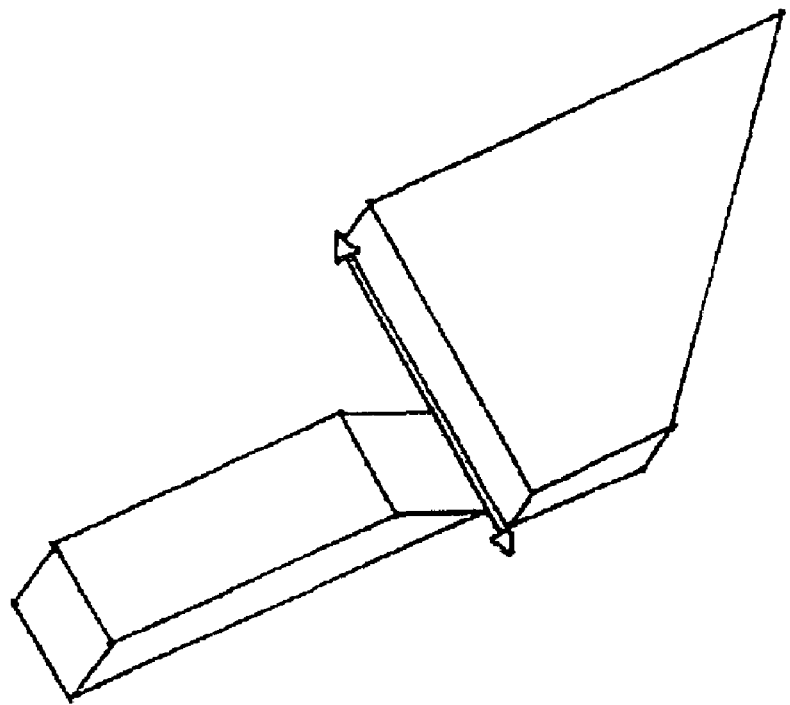

FIG. 7 shows the visual feedback for one translational degree of freedom, e. g. after an edge-to-surface association.

A further clarifying example is shown in the next four figures. Here, a 'counterpiece' is inserted into a plate with two holes. In the positioning procedure, first, an axis-to-axis association is carried out.

Figure 8:
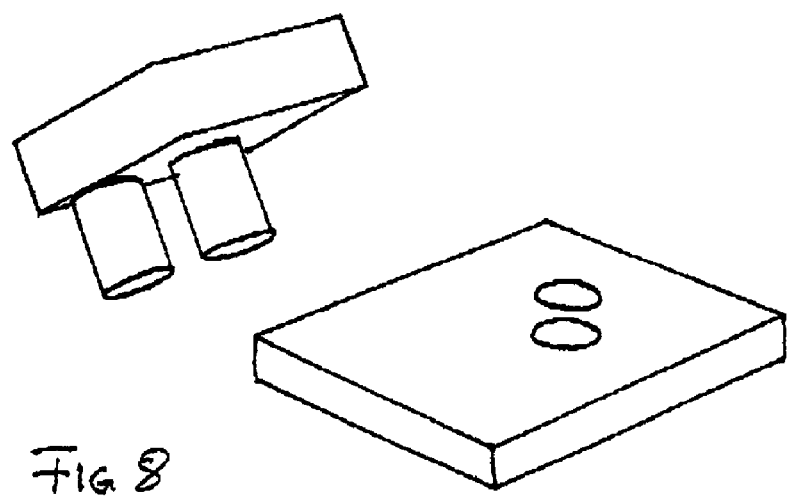

FIG. 8 shows the situation at the beginning of this process.

Figure 9:
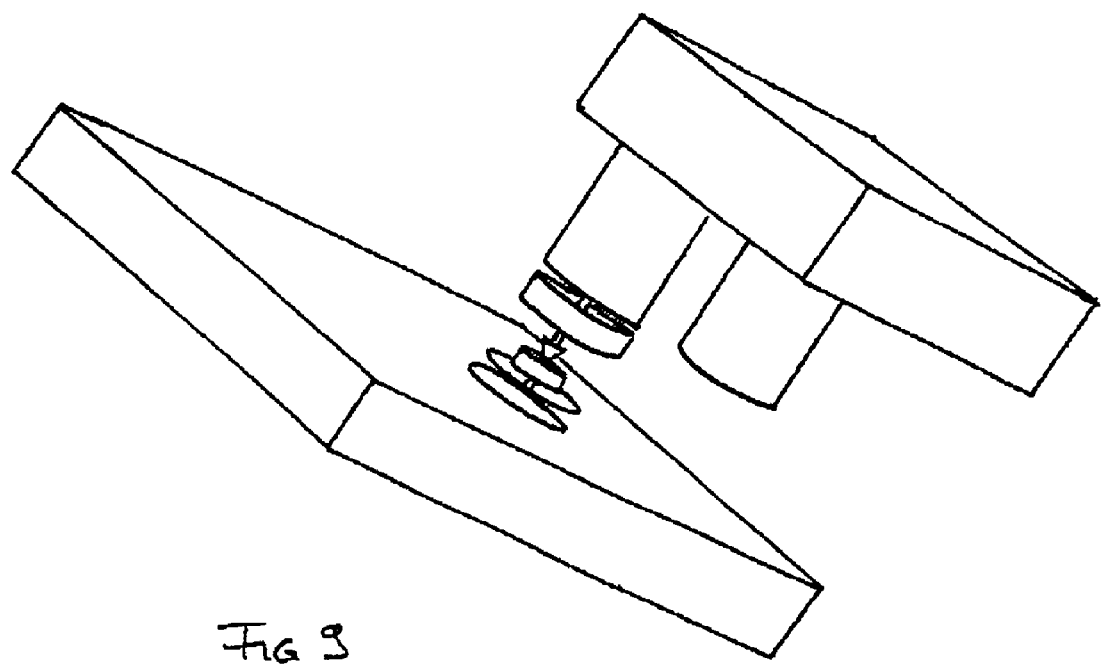

FIG. 9 shows the situation after the axis-to-axis association, showing a visual feedback element for one translational and one rotational degree of freedom.

Figure 10:
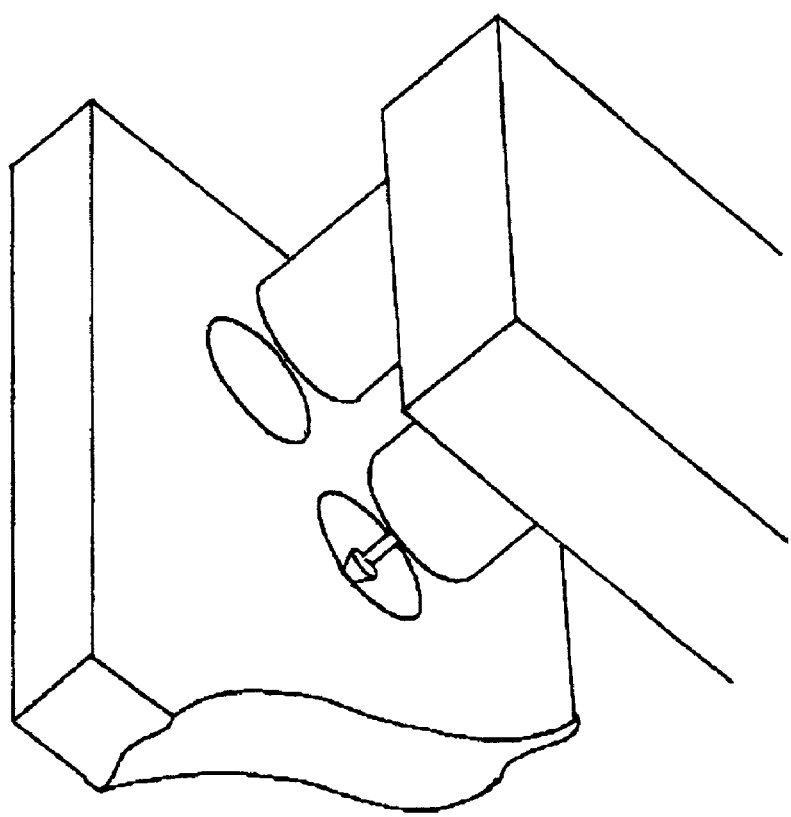

In a second interaction step, the two axes are associated by the user and FIG. 10 shows the situation after this axis-to-axis association. The visual feedback has only changed its position and orientation and shows the user that only one translational degree of freedom remains.

Figure 11:
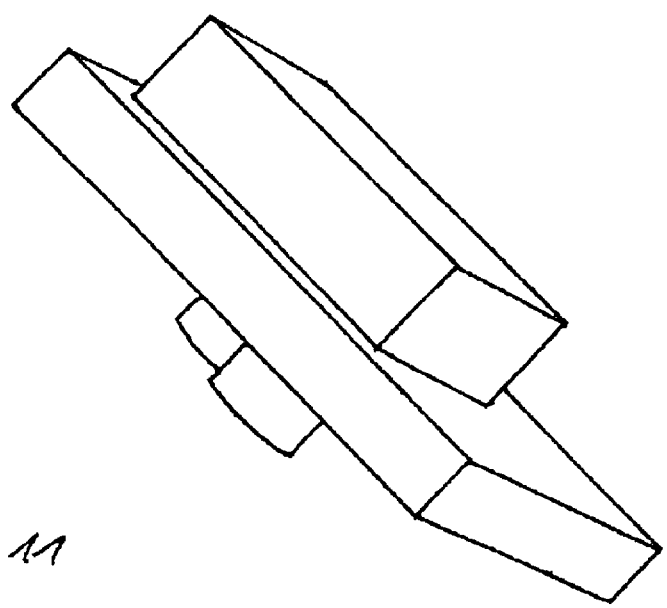

A final surface-to-surface association brings the components into their final position. FIG. 11 shows the final position of the components after the surface-to-surface association.

Thus, the present invention enables, in the simplest possible way, the assembly or construction of virtual 3D-CAD models which can be simultaneously worked on by a number of participants at spatially separate locations. By successively considering corners, edges, axes and surfaces of the partial models, these are interactively positioned, orientated and their movement possibilities are defined. The remaining degrees of freedom are incrementally transmitted to all users and instantaneously visualised. Thus, at every point in time, the distributed users see the same, current model.

Because the users are shown a visual depiction of the existing degrees of freedom of the part model, at all times, no knowledge of the history of the design process or positioning is needed.

Using the invention, CAD models of different types can be assembled or constructed in a simple manner, even by non-CAD system users, in a graphically interactive way and simultaneously by members of a team at different locations.

By successive allocations of corresponding topological entities (surfaces, edges, axes and corners), components are 'fixed' with respect to other components, both in position and orientation, in a maximum of three interaction steps.

The method does not make any definition as to the application of the model. The required information can be extracted from each 3D model without any additional information such as assembly features having previously been added. Thus, the method of the present invention enables members of a team to quickly, and without conflict, position and change the orientation of components relative to each other.

Compared to the known systems described above, the present invention has the following advantages:

The interaction is targeted, as required by the users;
Relationships between various components are not 'randomly' introduced;
The effects of associating two components can be immediately visualised by and to all users;
The remaining degree of freedom of each component is visually represented to all users;
Errors and obstructions can be immediately identified, for each operation, and conveyed to the users;
There is no need for the user to remember all of the constraints to be introduced and the effects of them;
No additional information needs to be brought in by the user into the modelling process, as is the case with assembly features;
The accuracy of a CAD model is maintained. There is no need for any reduction in accuracy, as in the case of collision detection, to enable real time interaction;
The remaining degrees of freedom of each component are transmitted incrementally, i. e. the changes only, to all participants, and are then built up and a visual feedback image is depicted;
All users can take part in the assembly or construction process essentially simultaneously.

The invention claimed is:

1. A method of manipulating computer aided design (CAD) objects, comprising:
   receiving user input to associate two CAD objects, wherein said user input identifies a coupling between said two CAD objects selected from a group of connections consisting of: a vertex-to-vertex connection, an axis-to-axis connection, an edge-to-axis connection, and a face-to-face connection;
   displaying said two CAD objects according to the coupling identified by the user input;
   calculating a reduction in degrees of freedom between said two CAD objects caused by said identified coupling;
   displaying an indication of said reduction in said degrees of freedom in association with the display of said two CAD objects; and
   verifying that said identified coupling is consistent with a prior coupling between said two CAD objects before performing said displaying said two CAD objects.

2. The method of claim 1 wherein at least one of said two CAD objects comprises a group of subcomponents.

3. The method of claim 1 further comprising:
   receiving user input to position said two CAD objects relative to each other before receiving said user input that identifies the coupling between said two CAD objects; and
   displaying said two CAD objects according to relative positioning.

4. The method of claim 1 further comprising:
   calculating a reduction in degrees of freedom caused by said relative positioning of said two CAD objects, wherein said calculation occurs before the coupling between said two CAD objects; and
   displaying said reduction in degrees of freedom in association with display of said two CAD objects.

5. The method of claim 1 wherein said receiving, displaying said two CAD objects, calculating, and displaying an indication are performed by a collaborative design application associated with a plurality of users.

6. The method of claim 5 wherein said collaborative design application maintains a virtual model including said two CAD objects, and wherein said displaying said two CAD objects and displaying said indication are performed by communicating only changes in said virtual model caused by said identified coupling.

7. The method of claim 5 further comprising:
   locking one of said two CAD objects in response to user input from a respective user, prior to receiving user input to associate two CAD objects, to prevent other users from manipulating said locked CAD object.

8. The method of claim 5 further comprising:
   unlocking said one of said two CAD objects after displaying said two CAD objects according to the identified coupling.

9. The method of claim 1 wherein said displaying said two CAD objects comprises:
   applying a transformation matrix to at least one of said two CAD objects.

10. A computer aided design (CAD) system, comprising:
    means for defining a virtual environment in which CAD objects are manipulated;
    means for receiving input from a user to associate two CAD objects within said virtual environment, wherein said input identifies a coupling between said two CAD objects selected from a group of connections consisting of: a vertex-to-vertex connection, an axis-to-axis connection, an edge-to-axis connection, and a face-to-face connection;
    means for displaying said two CAD objects according to the identified coupling;
    means for determining a reduction in degrees of freedom caused by said identified coupling;
    means for displaying an indication of degrees of freedom associated with said two CAD objects after application of said identified coupling; and
    means for determining whether said identified coupling is consistent with a prior coupling applied to one of said two CAD objects.

11. The CAD system of claim 10 wherein at least one of said two CAD objects comprises a plurality of subcomponents mutually associated using respective couplings.

12. The CAD system of claim 10 further comprising:
    means for receiving input from said user to position said two CAD objects relative to each other; and
    means for displaying said two CAD objects according to relative positioning.

13. The CAD system of claim 10 further comprising:
    means for applying transformation matrix operations to CAD objects that correspond to user manipulations of said CAD objects.

14. A method, comprising:
    providing a virtual environment in which computer aided design (CAD) objects are manipulated;
    receiving input from a user to associate two CAD objects within said virtual environment, wherein said input identifies a coupling selection from predefined connection relationships;
    displaying said two CAD objects according to the identified coupling;
    determining a reduction in degrees of freedom caused by said identified coupling;
    displaying an indication of degrees of freedom associated with said two CAD objects after application of said identified coupling; and
    determining whether said coupling identified by said user is consistent with prior couplings applied to one of said two CAD objects.

15. The method of claim 14 wherein at least one of said two CAD objects comprises a plurality of subcomponents mutually associated using respective couplings.

* * * * *